Oct. 13, 1942.　　　　E. B. ANDERSON　　　　2,299,001

UNIVERSAL JOINT

Filed July 5, 1940

Inventor:
Edmund B. Anderson
By: Edward C. Gritzbaugh
Atty.

Patented Oct. 13, 1942

2,299,001

UNITED STATES PATENT OFFICE 2,299,001

UNIVERSAL JOINT

Edmund B. Anderson, Rockford, Ill., assignor to Borg-Warner Corporation, Chicago, Ill., a corporation of Illinois Application July 5, 1940, Serial No. 343,951

1 Claim. (Cl. 64—17)

This invention relates to universal joints of the type embodying a pair of yokes connected by a spider having trunnions journalled in bearings carried by the respective arms of the yoke. In general, the object of the invention is to provide in such a universal joint, an improved trunnion bearing.

In the particular type of joint to which the invention is applied, the bearings are formed with functionally integral ears lying in a plane that is chordal with reference to the periphery of the bearing proper, which is usually in the form of a cup, the projecting portion of the bearing is seated in a fitted socket in a yoke arm, and the bearing is secured therein by cap screws extending through the ears and threaded into the yoke arm. The invention achieves a reduction in the cost of manufacture of such a bearing by forming the bearing cup separately from the ears with an exterior locating surface which may be very inexpensively formed by a turning or grinding operation, and providing separate ears in the form of a heavy stamping which is welded to the exterior surface of the cup, the ears forming the end extremities of a one piece yoke shaped strap having an intermediate arcuate web portion which has an accurately formed inner semi-cylindrical surface adapted to accurately locate against the exterior cylindrical surface of the bearing cup.

Another object of the invention is to provide a universal joint yoke and bearing assembly embodying a bearing cup with a welded ear strap having a high degree of dimensional accuracy.

A further object of the invention is to provide a universal joint embodying a bearing cup with a welded ear strap wherein the ear strap is provided with means for restraining the bearing cup against dislodgment under the effect of centrifugal force in the event the welded connection between the strap and cup should fail.

Other objects, the advantages and uses of the invention, will become more apparent after reading the following specification and claim and after consideration of the drawing forming a part of the specification, wherein:

Figure 1:
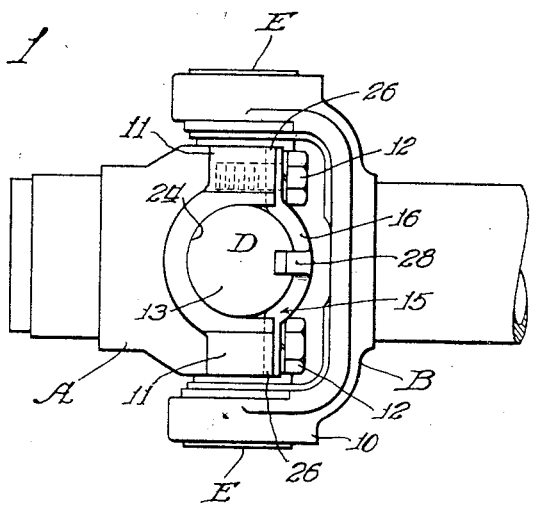
Fig. 1 is a side elevation of a universal joint embodying a bearing structure formed in accordance with the invention.
Figure 2:
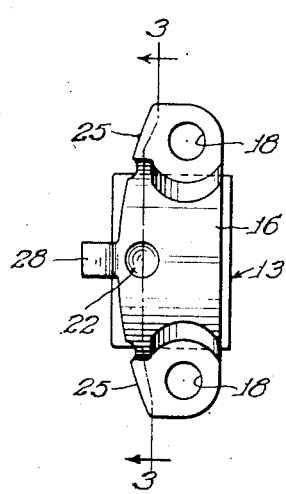
Fig. 2 is an end view of one of the yoke arms of the joint with the bearing attached.

As an example of an article manufactured in accordance with the invention, I have shown in the drawing a universal joint embodying a pair of yokes A and B connected by a trunnion spider C through which torque is transmitted between the yokes A and B. In general, the joint may be of the type shown in my pending application Serial No. 304,911 filed November 17, 1939.

The spider C has trunnions (not shown) which are journalled, preferably through the medium of roller bearings (which likewise are not shown), in bearings D and E which are attached to the respective arms of the yokes A and B respectively.

The bearings E may be of a type which are introduced into mounting rings 10 forming the arms of the yoke B. The present invention deals with the bearings D which, in order to permit assembly and disassembly of the joint, are mounted between furcations 11 forming the arms of the yoke A and are detachably secured thereto by cap screws 12.

Each bearing D includes a steel bearing cup 13 having a cylindrical outer surface 14 which is accurately formed preferably by a grinding operation. Prior to grinding, the cup is hardened, as by carburizing, and receives no further heat treatment after grinding. Thus the cylindrical surfaces of the cup are accurately concentric.

Figures 3, 4:
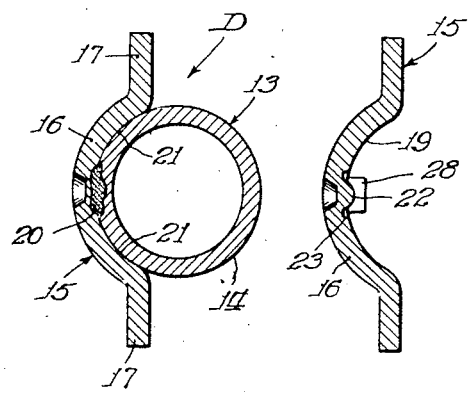
Fig. 3 is a transverse sectional view through one of the bearings taken as indicated by the line 3—3 of Fig. 2.
Fig. 4 is a sectional view through one of the ear straps prior to attachment to a bearing.
Figure 5:
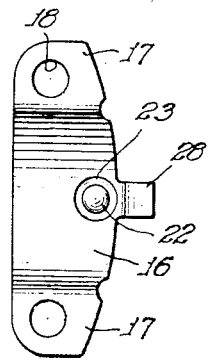
Fig. 5 is a side elevation of the same.
Figure 6:
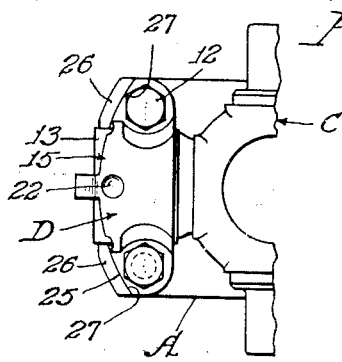
Fig. 6 is a plan view of the joint.

To the cup 13 is welded a stamped ear strap 15 having an arcuate web portion 16 and end portions forming ears 17 which are apertured as at 18 to receive the cap screws 12. The inner surface 19 of the web 16 is accurately formed to fit the cylindrical surface 14 of the bearing cup. Accuracy of assembly is maintained by restricting the weld to the central region of the web 16 as indicated at 20 in Fig. 3, and maintaining a purely abutting, unwelded contact between the side regions of the surfaces 19 and 14, as indicated at 21.

The weld 20 is derived from a projection 22 which is formed in the strap 15 during the stamping operation. During the welding operation this projection is fused with the adjacent metal of the bearing cup 13 as indicated at 20, the strap being urged against the cup under pressure which causes the surfaces 19 to advance into snug engagement with the surface 14 as the projection is melted down.

The invention provides for accuracy of assembly by insuring full contact between the surfaces 19 and 14 in the regions 21. To this end, there is formed in the stamping prior to welding, around the projection 22, a channel 23 into which the excess weld metal flows so as to permit the strap to advance into tight contact with the surface 14. The channel 23 avoids the possibility of the locating surfaces being held apart by the weld metal.

The strap 15 embraces somewhat less than half of the periphery of the bearing cup 13, leaving the remainder of the cup projecting beyond the ears 17. This projecting portion of the cup is received between the furcations 11 of the yoke A and is seated against a semi-cylindrical locating surface 24 in the yoke. Thus the bearing is accurately located axially and circumferentially with reference to the yoke.

The bearing is located radially with reference to the yoke by the engagement of arcuate edge surfaces 25 formed on the ears 17 against shoulders 26 formed on the ends of the furcations 11. The locating surfaces 27 of the shoulders 26 are concentric with the axis of the yoke A and may be formed by a concentric grinding operation. The edge surfaces 25 of the ears 17 are likewise concentric with the yoke axis, so as to fit the surfaces 27, and are formed in the blanking of the strap 15. If desired, the surfaces 25 may be finished by a broaching operation.

The engagement of the ears 17 against the shoulders 26 relieves the cap screws 12 of centrifugal loads and assures accurate radial positioning of the bearing.

Each strap 15 is provided in its central region with a projecting finger 28 which is bent toward the plane of the ears 17 so as to extend over the end of the bearing cup 13. The fingers 28 may serve the dual function of providing an abutment against which the ends of the bearing may be located for temporary assembly prior to the welding operation, and serving to retain the bearing cups against escape from assembly during operation in the event the weld should fail.

It may be noted that the surfaces 14 of the bearing cups 13 serve the dual function of providing locating surfaces for accurate assembly of the bearing straps 15 to the cups, and providing locating surfaces for accurate assembly in the yoke A. The surfaces 14 may be made very accurate in view of the fact that they can be formed in a turning or grinding operation. At the same time, the cost of such operations is far less than the broaching operations which would be necessary for forming the surfaces 14 and the ears 17 in the event that the latter were formed integrally with the bearing cup as in earlier structures of the general type under consideration.

By restricting the weld to the central region of the strap and providing for full contact between unfused locating surfaces on either side of the weld, the accuracy of assembly which may be obtained is limited only by the tolerances in the forming and machining of the surfaces 19 and 14.

The feature of providing the channel around the welding projection so as to assure full and tight contact between the locating surfaces on either side of the weld may be profitably applied to projection welding of any article wherein the problem of obtaining accurate assembly of the parts is a paramount one. In this respect, the invention is not restricted to universal joint bearing assemblies, but is applicable to projection welding in general.

I claim:

In a universal joint, a yoke having an arm provided with a bearing seat, a bearing comprising a cup one side of which is in seating engagement with said seat and an ear strap including an arched central region engaging and partially embracing the opposite side of the cup and welded thereto, and end regions forming ears which are secured to the end of said arm, said strap being formed with a finger overlapping the outer end of the bearing cup and adapted to retain the same against escape under the effect of centrifugal force in the event of the failure of said weld

EDMUND B. ANDERSON.